(12) United States Patent
Grewal et al.

(10) Patent No.: US 9,671,270 B2
(45) Date of Patent: Jun. 6, 2017

(54) FLOW METER HAVING ELECTRONIC MOUNT BRACKET ASSEMBLY

(71) Applicant: DANIEL MEASUREMENT AND CONTROL, INC., Houston, TX (US)

(72) Inventors: Randeep Singh Grewal, Houston, TX (US); Kerry Dwayne Groeschel, Houston, TX (US); Nick Bohr, Houston, TX (US); Jorge Enciso, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 133 days.

(21) Appl. No.: 14/813,886

(22) Filed: Jul. 30, 2015

(65) Prior Publication Data

US 2017/0030755 A1    Feb. 2, 2017

(51) Int. Cl.
*G01F 1/66* (2006.01)
*G01F 15/14* (2006.01)

(52) U.S. Cl.
CPC .................... *G01F 15/14* (2013.01)

(58) Field of Classification Search
None
See application file for complete search history.

(56) References Cited

U.S. PATENT DOCUMENTS

| | | | | |
|---|---|---|---|---|
| 5,877,430 A | * | 3/1999 | Peace | G01F 1/10 73/861.82 |
| 6,119,528 A | * | 9/2000 | Genack | G01F 1/22 73/861.12 |
| 2010/0005901 A1 | * | 1/2010 | Groeschel | G01F 1/667 73/861.27 |
| 2011/0162460 A1 | * | 7/2011 | Allen | G01F 1/667 73/861.18 |
| 2011/0162461 A1 | * | 7/2011 | Allen | G01F 1/662 73/861.18 |
| 2011/0162462 A1 | * | 7/2011 | Allen | G01F 1/662 73/861.18 |
| 2011/0162463 A1 | * | 7/2011 | Allen | G01F 1/662 73/861.18 |
| 2012/0247225 A1 | * | 10/2012 | Allen | G01F 1/66 73/861.18 |

FOREIGN PATENT DOCUMENTS

CN         205280160 U  *  6/2016

* cited by examiner

*Primary Examiner* — Andre Allen
(74) *Attorney, Agent, or Firm* — Conley Rose, P.C.

(57) ABSTRACT

A flow meter includes a meter body having a longitudinal axis and including a fluid passageway and an outer surface, and a plurality of electronics housings supported on the meter body by a mounting member, wherein the mounting member includes a base, a tubular member having a passage extending therethrough for the passing of a transducer cable, and a bracket member coupled to the tubular member distal the base, the bracket member having a pair of elongate slots, each configured to allow for the passage of a transducer cable to one of the electronics housings.

20 Claims, 14 Drawing Sheets

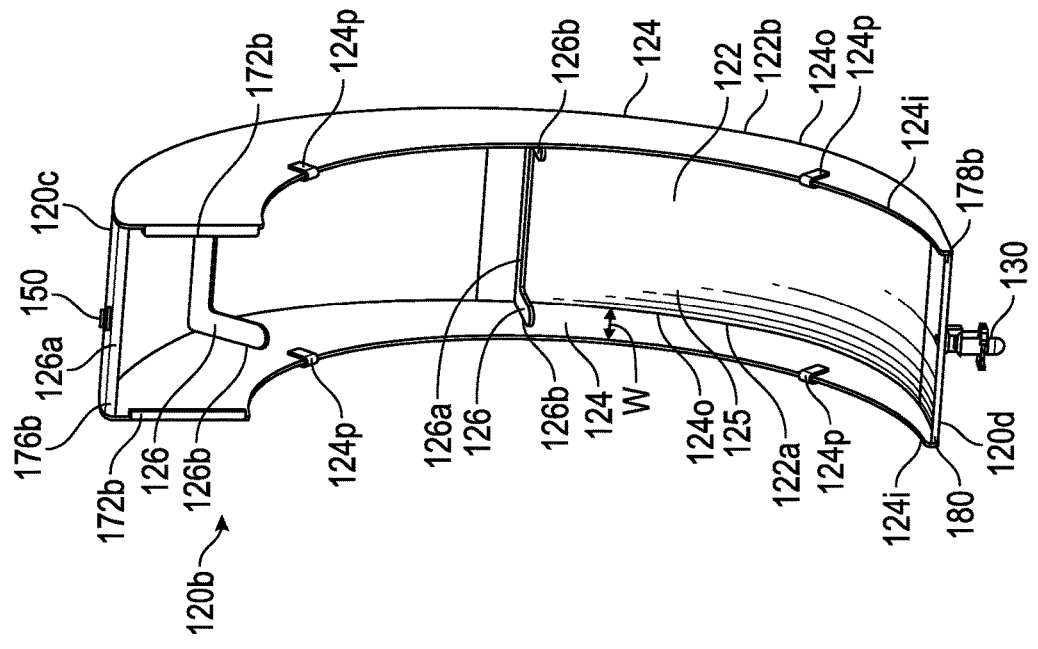
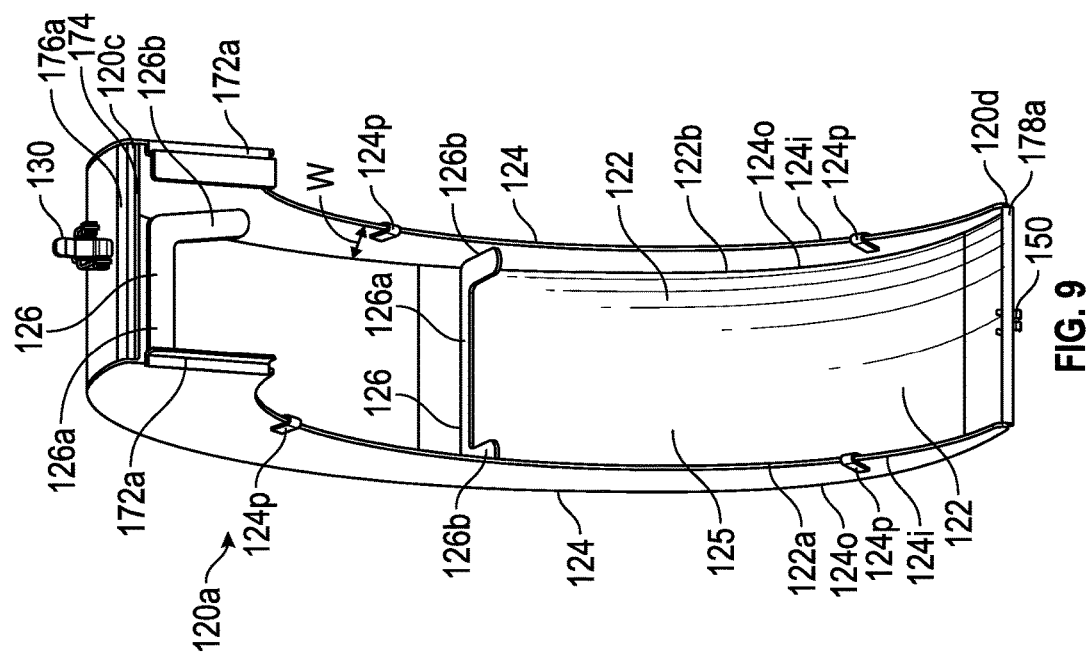

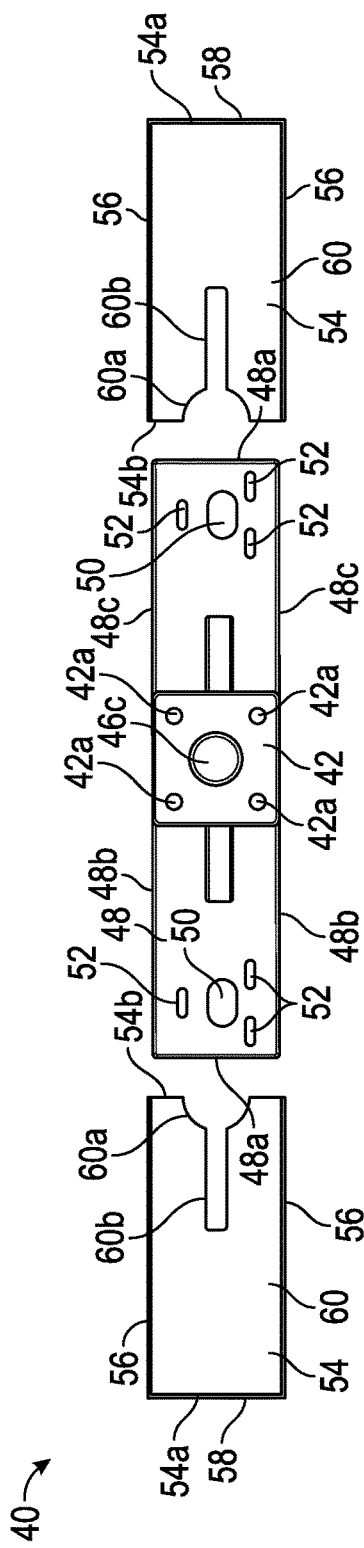
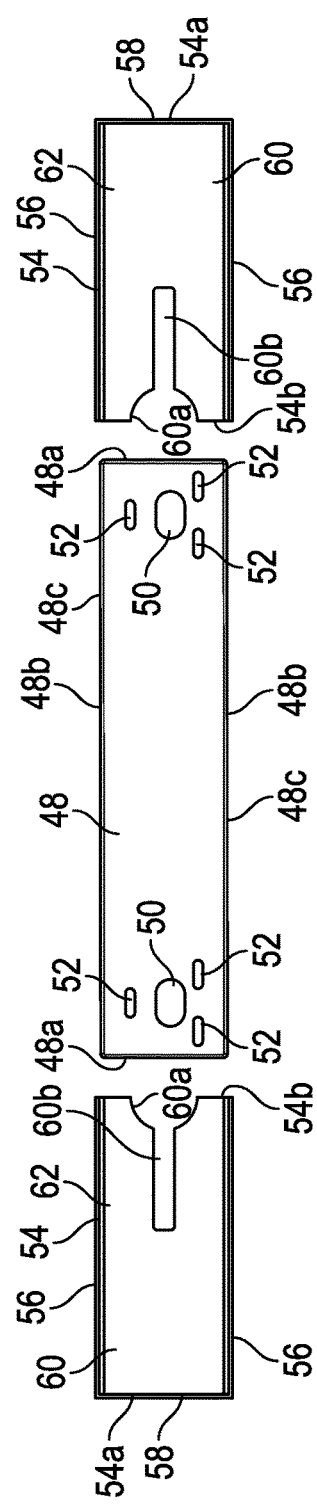
FIG. 18
FIG. 19

FLOW METER HAVING ELECTRONIC MOUNT BRACKET ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to liquid and gas flow meters. More particularly, it relates to apparatus and systems for enclosing and protecting transducers and transducer cables that are employed with ultrasonic flow meters.

Hydrocarbons, in both liquid and gas phases, are transported from place to place via pipelines. It is desirable to accurately know the amount of fluid flowing in the stream, particularly when the fluid is changing hands, an event referred to as "custody transfer." Even where custody transfer is not taking place, measurement accuracy is desirable, and in these situations, ultrasonic flow meters are commonly used.

An ultrasonic flow meter includes a meter body having a central conduit that serves as a fluid passageway for conducting the fluid (liquid or gas) that is being transported in the pipeline, and a pair of flanges for connecting the meter between aligned sections of the pipeline. The body of the flow meter may also be referred to as a spool piece. The ultrasonic flow meter further includes two or more transducer assemblies, each secured in a dedicated port that is formed in the meter body. To measure fluid flow through the meter, the transducer assemblies of the pair are positioned such that the piezoelectric elements of the transducers are adjacent to the inner surface of the spool piece, and such that each transducer faces the other of the pair, which is positioned on the opposite side of the fluid passageway. The transducer assemblies transmit and receive electric signals back-and-forth across the fluid stream.

Each transducer assembly is coupled to a cable that extends from an end connector of the assembly to a remote location, typically an electronics enclosure mounted on or adjacent to the spool piece. The electric signals created by the piezoelectric element of each transducer assembly is carried by the cable to an acquisition circuit board housed within the electronics enclosure, where the signal may be processed and subsequently used to determine useful data including the rate and volume of fluid flow through the flow meter.

If left exposed, the transducers and cables are susceptible to being tampered with and becoming damaged by falling debris, roaming livestock, and vandals. Further, if left unprotected, the cables and transducers are exposed to possible damage during shipping and installation. Further, the cables' insulation can degrade due to constant exposure to weather and sunlight. Consequently, it has been common to employ robust and thus relatively expensive cables in an attempt to resist damage and degradation.

Additionally, attempts have been made to manufacture meter bodies having internal cable passageways that are formed in the walls of the meter body to at least partially cover the cables and provide some degree of protection. In some such products, the ends of the transducer assemblies and portions of the cables are nevertheless still exposed. This arrangement leaves them susceptible to damage or to being tampered with, which may limit the meter's performance in accurately measuring the fluid flow. Other flow meters have included covers intended to completely enclose and protect the transducers and the cables; however, some such covers have had intricate designs that create manufacturing and cable-routing challenges and increased cost.

Other cover designs have required that the transducer assemblies be mounted in deep pockets formed in the meter body so as to limit the extension height of the transducer assemblies above the body's surface. This has required the use of significantly larger meter bodies with thicker walls, larger diameters, and/or greater flange-to-flange length that, in turn, leads to increased weight and cost. Still other covers have been flexible to a degree that creates some difficulty in removing and then properly reinstalling the cover in the field, or have required fasteners that are inconvenient or difficult to install and remove.

SUMMARY OF THE DISCLOSURE

An embodiment of a flow meter comprises a meter body having a longitudinal axis and comprising a fluid passageway therethrough and an outer surface, and a plurality of electronics housings supported on the meter body by a mounting member, wherein the mounting member comprises: a base supported by the outer surface of the meter body, a tubular member extending from the base, the tubular member having a passage extending therethrough for the passing of a transducer cable, and a bracket member coupled to the tubular member distal the base, the bracket member having a pair of elongate slots, each configured to allow for the passage of a transducer cable to one of the electronics housings. In an embodiment, the mounting member further comprises a first removeable cover forming a first chamber between the first removeable cover and the bracket member, the first removeable cover comprising a bottom, and a pair of sides coupled to said bottom, the sides comprising a pair of rails slidingly received within a pair of grooves of the bracket member. In an embodiment, the tubular member comprises a flange having a first end coupled to the bracket member and a second end coupled to the base, wherein the first end has a width greater than the second end. In some embodiments, the flow meter further comprises a transducer assembly coupled to said meter body, and a transducer cable having a first end coupled to the transducer assembly, the transducer cable extending through the passage in the tubular member and through the first chamber. In some embodiments, the flow meter further comprises a groove extending longitudinally along the outer surface of the meter body, the groove extending underneath the base of the mounting member. In an embodiment, the flow meter further comprises a shroud covering the transducer cable between the transducer assembly and the longitudinal groove. In an embodiment, the first removeable cover comprises a keyhole shaped slot extending from an end of the first removeable cover member. In some embodiments, the mounting member further comprises a second removeable cover axially aligned with the first removeable cover, forming a second chamber between the second removeable cover and the bracket member, the second removeable cover comprising a bottom, and a pair of sides coupled to said bottom, the sides comprising a pair of rails slidingly received within a pair of grooves of the bracket member. In some embodiments, the first removeable cover comprises a fastener for coupling the first removeable cover to an axial end of the bracket member. In some embodiments, the fastener comprises a captive screw retained to the first removeable cover.

An embodiment of a flow meter comprises a meter body having a longitudinal axis, and comprising a fluid passageway therethrough and an outer surface, and an electronics housing supported on the meter body by a mounting member, wherein the mounting member comprises: a base supported by the outer surface of the meter body, a tubular member extending from the base, the tubular member having a passage extending therethrough for the passing of a transducer cable, a bracket member coupled to the tubular member distal the base, the bracket member having an elongate slot configured to allow for the passage of a transducer cable to the electronics housing, and a first removeable cover supported on the bracket member and configured to slide relative to the bracket member. In an embodiment, the mounting member further comprises a first removeable cover forming a first chamber between the first removeable cover and the bracket member, the first removeable cover comprising a bottom, and a pair of sides coupled to said bottom, the sides comprising a pair of rails slidingly received within a pair of grooves of the bracket member. In an embodiment, the bracket member comprises a flange having a first end coupled to the bracket and a second end coupled to the base, wherein the first end has a width greater than the second end. In some embodiments, the flow meter further comprises a transducer assembly coupled to said meter body, and a transducer cable having a first end coupled to the transducer assembly, the transducer cable extending through the passage in the tubular member and through the first chamber. In some embodiments, the bracket member of the mounting member comprises a pair of elongate slots, each configured to allow for the passage of a transducer cable to the electronics housing. In an embodiment, the flow meter further comprises a groove extending longitudinally along the outer surface of the meter body, the groove extending underneath the base of the mounting member, and a shroud covering the transducer cable between the transducer assembly and the longitudinal groove. In an embodiment, the first removeable cover comprises a keyhole shaped slot extending from an end of the first removeable cover. In some embodiments, the flow meter further comprises a second removeable cover axially aligned with the first removeable cover, forming a second chamber between the second removeable cover and the bracket member, the second removeable cover comprising a bottom, and a pair of sides coupled to said bottom, the sides comprising a pair of rails slidingly received within a pair of grooves of the bracket member. In some embodiments, the first removeable cover comprises a fastener for coupling the removeable cover to an axial end of the bracket member. In an embodiment, the fastener comprises a captive screw retained to the removeable cover.

BRIEF DESCRIPTION OF THE DRAWINGS

For a detailed description of the disclosed exemplary embodiments, reference will now be made to the accompanying drawings in which:

FIG. 9 is a perspective view of a first partial shroud member of the ultrasonic flow meter of FIG. 1 in accordance with principles disclosed herein;

FIG. 10 is a perspective view of a second partial shroud member of the ultrasonic flow meter of FIG. 1 in accordance with principles disclosed herein;

FIG. 18 is an exploded bottom view of the electronic mount bracket assembly of FIG. 14;

FIG. 19 is an enlarged, exploded top view of a connection between the electronic mount bracket assembly and a lower electronics housing of the ultrasonic flow meter of FIG. 1 in accordance with principles disclosed herein;

DETAILED DESCRIPTION OF THE DISCLOSED EXEMPLARY EMBODIMENTS

Figure 1:
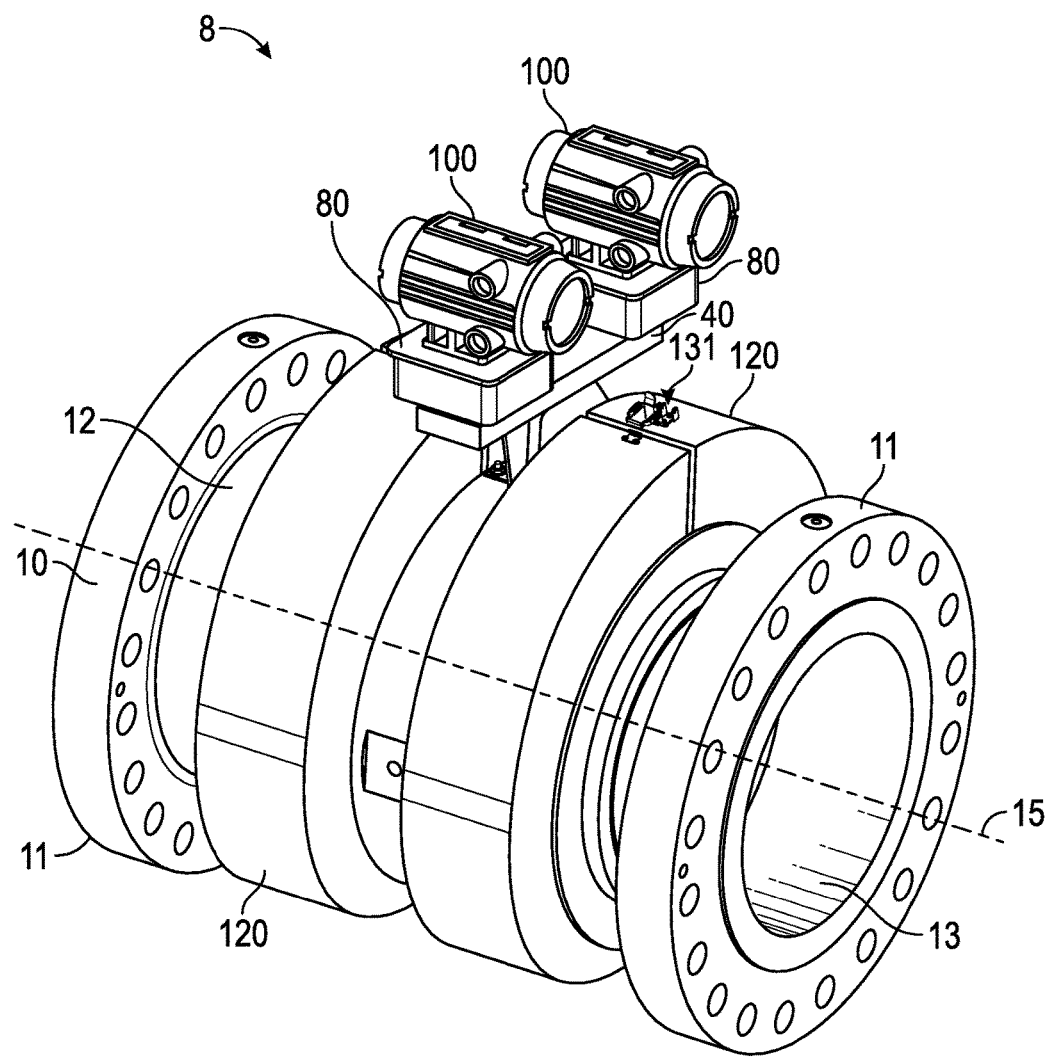
FIG. 1 is a perspective view of an embodiment of an ultrasonic flow meter including a pair of protective shrouds in accordance with principles described herein.
Figure 2:
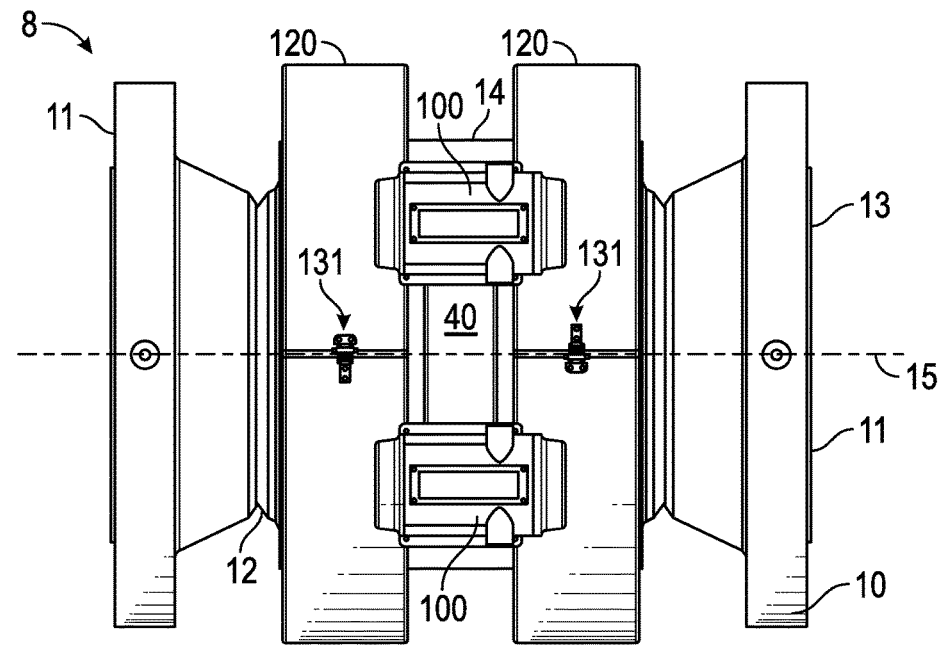
FIG. 2 is a top view of the ultrasonic flow meter of FIG. 1.
Figure 3:
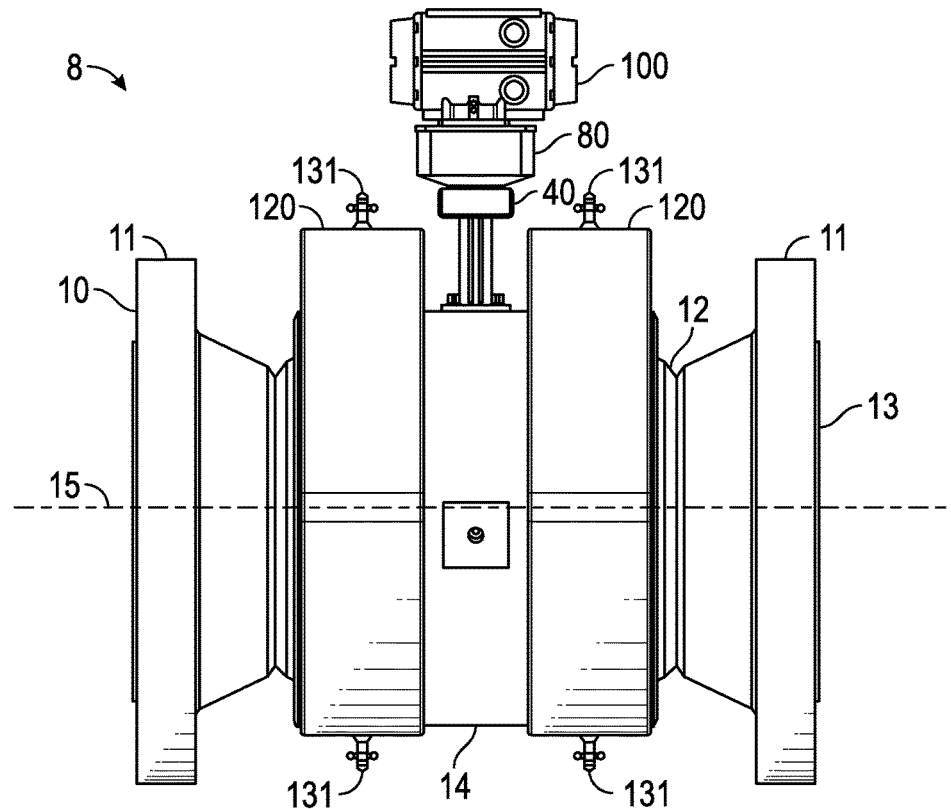
FIG. 3 is a side elevation view of the ultrasonic flow meter of FIG. 1.
Figure 4:
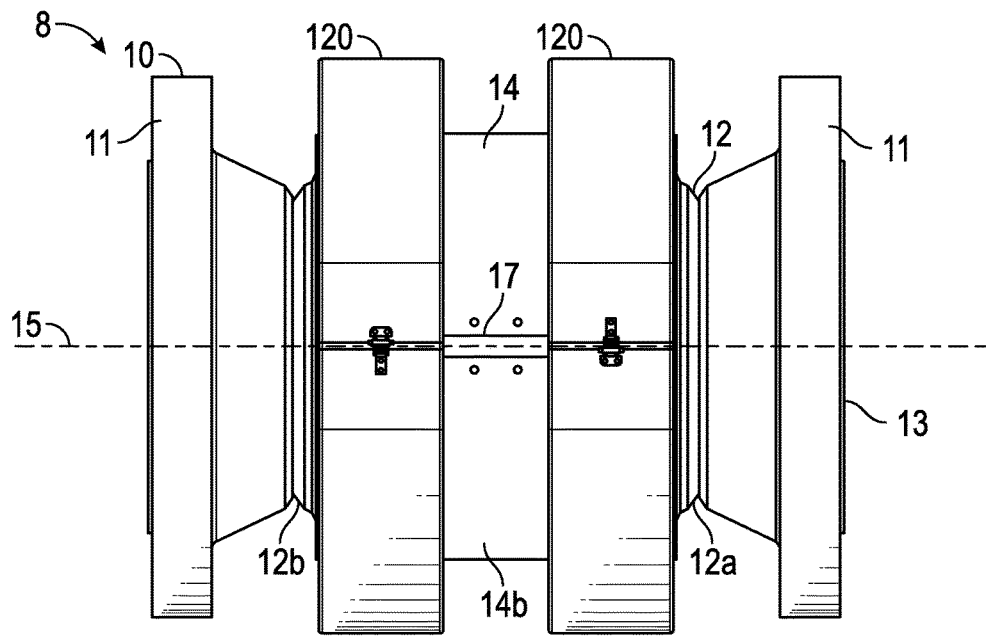
FIG. 4 is a bottom view of the ultrasonic flow meter of FIG. 1.

The following description is exemplary of embodiments of the disclosure. These embodiments are not to be interpreted or otherwise used as limiting the scope of the disclosure, including the claims. One skilled in the art will understand that the following description has broad application, and the discussion of any embodiment is meant only to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness.

The terms "including" and "comprising" are used herein, including in the claims, in an open-ended fashion, and thus should be interpreted to mean "including, but not limited to . . . ." Also, the term "couple" or "couples" is intended to mean either an indirect or direct connection. Thus, if a first component couples or is coupled to a second component, the connection between the components may be through a direct engagement of the two components, or through an indirect connection that is accomplished via other intermediate components, devices and/or connections. If the connection transfers electrical power or signals, the coupling may be through wires or through one or more modes of wireless electromagnetic transmission, for example, radio frequency, microwave, optical, or another mode.

In some of the figures, one or more components or aspects of a component may be not displayed or may not have reference numerals identifying the features or components that are identified elsewhere in order to improve clarity and conciseness of the figure.

In addition, as used herein, the terms "axial" and "axially" generally mean along or parallel to a given axis (e.g., central axis of a body or a port), while the terms "radial" and "radially" generally mean perpendicular to the axis. For instance, an axial distance refers to a distance measured along or parallel to the axis, and a radial distance means a distance measured perpendicular to the axis.

Figure 5:
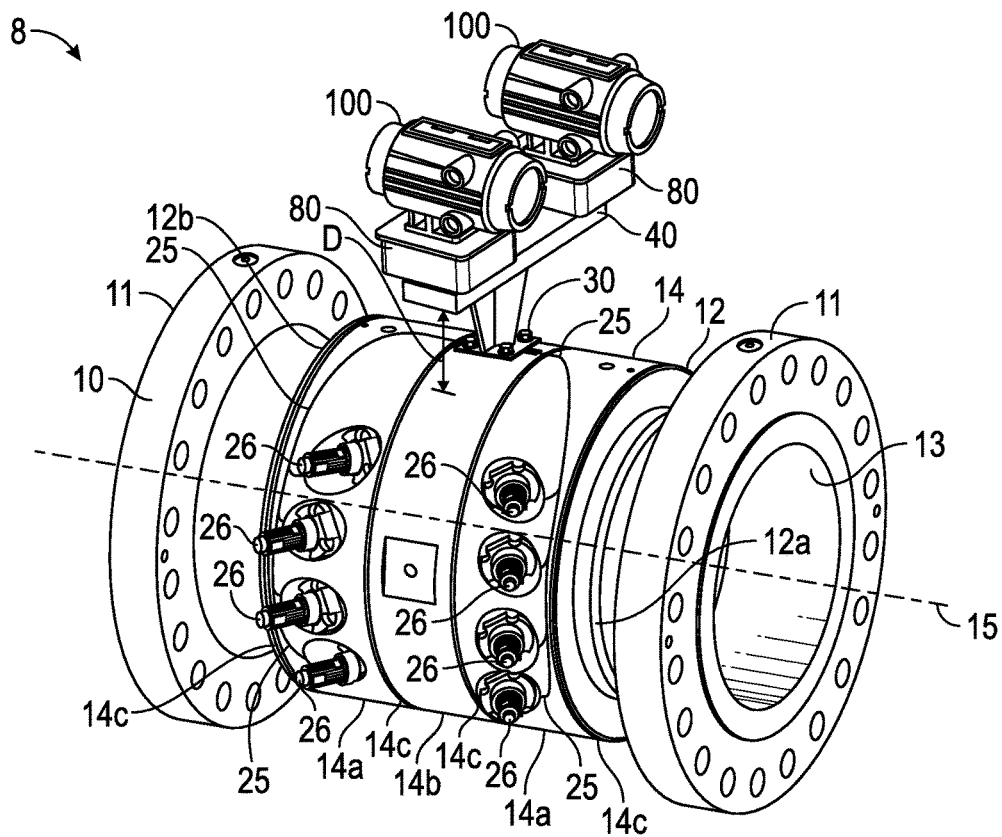
FIG. 5 is a perspective view of the ultrasonic flow meter of FIG. 1 shown with the shrouds removed.
Figure 6:
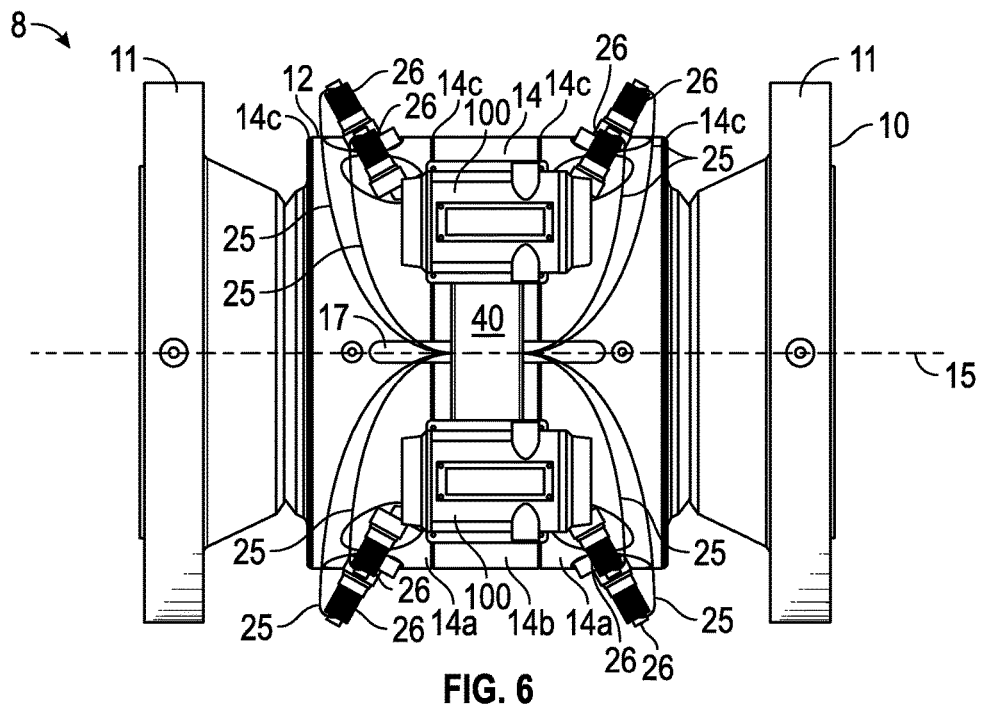
FIG. 6 is a top view of the ultrasonic flow meter of FIG. 1 with the shrouds removed.

Referring now to FIGS. 1-4, an exemplary embodiment of an ultrasonic flow meter 8 made in accordance with principles disclosed herein includes a meter body or spool piece 10 that is suitable for placement between aligned sections of a pipeline, and that includes a central flow passage 13 through which fluid flow may be measured. Typically, meter body 10 is forged, and then machined to its final form; however, it may be manufactured by any suitable technique. In this embodiment, flow meter 8 further includes a central or longitudinal axis 15, an electronic mount bracket member 40, lower and upper electronic housings 80, 100, and a pair of protective shrouds 120. Shrouds 120 are disposed about meter body 10 and are axially spaced apart from one another with mount bracket 40 disposed therebetween. Mount bracket 40 couples to and supports each lower electronics housing 80. Referring briefly to FIGS. 5 and 6, where shrouds 120 are hidden from view, ultrasonic flow meter 8 also includes a plurality of transducer assemblies 26 coupled to meter body 10 and transducer cables 25 extending from transducer assemblies 26 to lower electronics housing 80.

Figure 7:
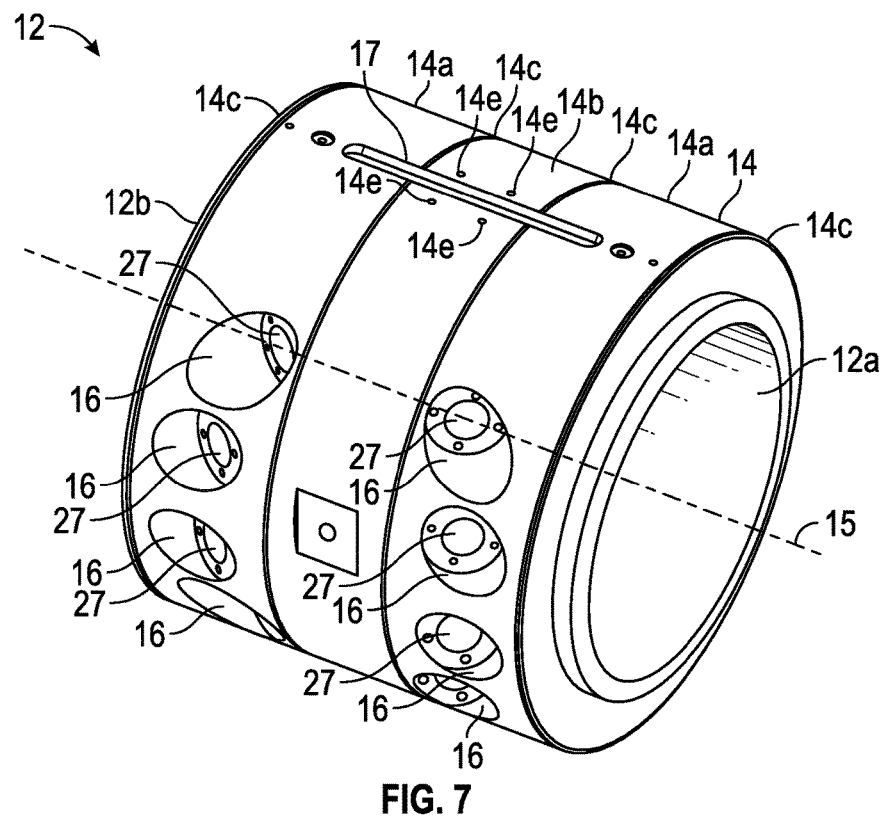
FIG. 7 is a perspective view of a central tubular section of a meter body of the ultrasonic flow meter of FIG. 1 in accordance with principles described herein.

Referring now to FIGS. 5-7, meter body 10 has a central or longitudinal axis coaxial with meter axis 15 and generally includes a central tubular section 12 disposed axially between a pair of flanges 11, each flange being configured for connection to corresponding flanges (not shown) on the pipeline sections. Tubular section 12 includes a first axial end 12a coupled to a first flange 11 and a second axial end 12b coupled to a second flange 11. As shown best in FIG. 7 where flanges 11 are hidden, tubular section 12 of body 10 includes a curved and generally cylindrical outer surface 14 that may be considered as divided into three axially extending sections: a pair of axially outer sections 14a and an axially inner or central section 14b disposed therebetween. More specifically, each outer axial portion 14a extends axially from an end (12a and 12b) of tubular section 12 to central portion 14b. Each axially outer portion 14a is bounded by a pair of curved, circumferentially extending channels or grooves 14c, with one circumferential groove 14c disposed proximal an end (12a or 12b) of tubular section 12 and one groove 14c disposed proximal central portion 14b. Circumferential grooves 14c are provided to receive edges of the shroud 120, as explained in more detail below.

Each outer portion 14a of outer surface 14 includes a plurality of circumferentially disposed pockets 16. Each pocket 16 includes a bore or port 27 that extends radially from outer surface 14 to central flow passage 13. Transducer assemblies 26 (shown in FIG. 5) are received and secured in ports 27 (FIG. 7) and are electrically coupled to circuitry within lower electronics housing 80 via cables 25 (shown in FIG. 5). For brevity, as used herein, "transducer assembly" may be referenced herein simply as "transducer." Outer surface 14 also includes a longitudinally-extending channel 17 (shown in FIG. 7) that is parallel with axis 15, and is circumferentially displaced from pockets 16. Longitudinal channel 17 passes entirely through central portion 14b of outer surface 14 and extends into each outer portion 14a.

As shown particularly in FIGS. 5 and 7, a transducer 26 is retained within each transducer pocket 16, and each transducer 26 engages a port 27 and is sealed to prevent fluid from escaping central flow passage 13. A transducer cable 25 extends between the transducer 26 and a lower electronics housing 80 via outer portions 14a of outer surface 14 and longitudinal channel 17, and electrically couples the transducer 26 to circuits that are housed in the lower electronics housings 80. As best understood with reference to FIGS. 5 and 7, each outer portion 14a supports eight transducers 26 (four on each side of the meter body 10), and eight cables 25 that terminate in one of the lower electronics housings 80. While in this embodiment ultrasonic flowmeter 8 includes eight transducers 26, with each transducer 26 coupled to a transducer cable 25, in other embodiments ultrasonic flowmeter 8 could include varying numbers of transducers 26 and cables 25. Further, in other embodiments ultrasonic flowmeter 8 may include transducer cables 25 that extend between two transducers 26 instead of extending between a transducer 26 and the lower housing 80, and accordingly, the number of transducers 26 may be greater than the number of cables 25 extending between a transducer 26 and lower electronics housing 80. As will be explained further herein, shrouds 120 are configured to protect transducers 26 and cables 25 as the cables extend between transducers 26 and electronics housings 80.

Referring to FIGS. 9 and 10, each shroud 120 includes a pair of partial shroud members 120a and 120b that are fitted about the meter body 10 and couple with one another to form annular chamber 125 which, as described below, serves as a wireway for managing and protecting the transducer cables 25. Each partial shroud member 120a, 120b spans approximately 180° of the outer surface 14 of the meter body 10, and extends from a first or upper end 120c to a second or lower end 120d.

In more detail, each partial shroud member 120a, 120b includes a curved outer strip 122 attached to a pair of side members 124, the side members 124 being spaced apart an axial distance equal to the distance between the pair of circumferential grooves 14c formed in the meter body's outer surface 14. Each side member 124 extends in a generally radial direction relative to axis 15, and includes an inner edge 124i and an outer edge 124o. The inner edge 124i of each side member 124 is disposed within one of the circumstantial grooves 14c and is curved to substantially match the curvature of groove 14c. The inner edge 124i of each side member 124 includes a pair of circumferentially spaced pads 124p disposed thereon, wherein each pad 124p extends radially inwards from inner edge 124i. Circumferentially spaced pads 124p are configured to prevent the inner edge 124i of each side member 124 of shroud members 120a and 120b of contacting the meter body's outer surface 14. In this arrangement, pads 124p may prevent the inner edge 124i of each side member 124 from removing corrosion preventing paint disposed on the outer surface 14. The outer edge 124o of each side member 124 is coupled to the outer strip 122 and has a radius of curvature that varies along its length as it extends between upper and lower ends 120c, 120d. Annular chamber 125 is thus formed and bounded by the pair of side members 124 and outer strip 122 of each shroud member 120a, 120b and by the meter body's outer surface 14. In cross section, annular chamber is generally rectangular in shape.

Figure 8:
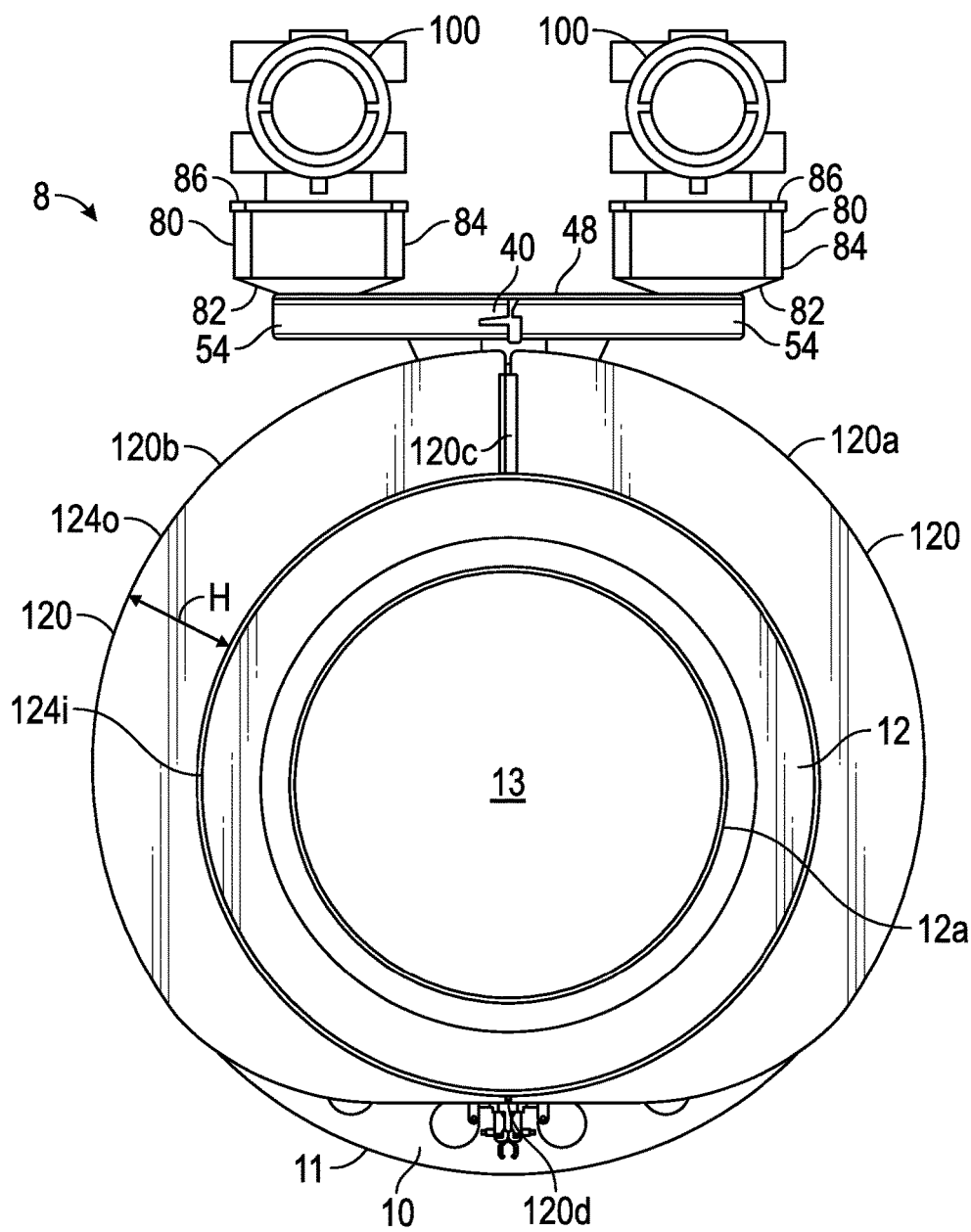
FIG. 8 is a front view of the ultrasonic flow meter of FIG. 1 with a flange of the meter body removed.

As best shown in FIG. 8, the distance as measured radially from inner edge 124i to outer edge 124o defines the height H of the side member 124, and such height H varies from a minimum dimension to a maximum dimension. The partial shroud members 120a, 120b are positioned about the meter body 10 such that, in this embodiment shown in FIGS. 1-8, the portion of the side member 124 having the maximum height H is generally on top of the meter body, adjacent upper end 120c and longitudinal channel 17, while the portion having the minimum height H is generally positioned 180° apart, at the bottom of the meter body 10 adjacent lower end 120d. In this arrangement, the annular chamber 125 forming the cable wireway has the smallest cross-sectional area at the bottom of the meter body 10 adjacent ends 120d, and the largest cross-sectional area at the top of the meter body 10 adjacent upper ends 120c. However, in other embodiments the portion of the side member 124 having the maximum height H may be disposed at other positions on the meter body 10, such as at the bottom of body 10. As FIG. 8 further illustrates, although the radially-inner edges of side members 124 form a circular opening for engaging the outer diameter of meter body 10, the outer profile of shroud 120 is differently-shaped. More specifically, in the embodiment of FIG. 8, the outer profile is non-circular, and may generally be described as ovoid or egg-shaped when viewed from the end of meter 8, along axis 15.

Shroud 120, and each partial shroud member 120a, 120b, is generally rigid so as to ensure that chamber 125 maintains its shape so as to provide the desired protection to the cables 25 and to ensure ease of installation of shroud 120 about meter body 10. To provide the desired rigidity, the curved outer strip 122 and each side member 124 may be formed of a sheet metal, such as steel having a thickness 0.060 inches or more, for example. For greater stiffness, the sheet material may, for example, be steel having thickness of 0.090 inches. However, in other embodiments the thickness of outer strip 122 and side members 124 may be less (e.g., 0.030 inches). Aluminum may also be employed. To provide even greater stiffness to each partial shroud member 120a, 120b and thus to each shroud 120, U-shaped stiffeners 126 may be circumferentially spaced within chamber 125. For example, as best shown in FIGS. 9, 10, each U-shaped stiffener 126 includes a base portion 126a attached to the inner surface of the outer strip 122, and a pair of leg portions 126b, each leg portion being attached to the inner surface of a side member 124. The U-shaped stiffener 126 may be welded in position. Partial shroud member 120a, 120b, or portions thereof, may be stamped, cut or otherwise formed from a single, unitary sheet of material and then fashioned into the desired shape and configuration.

Figure 12A:
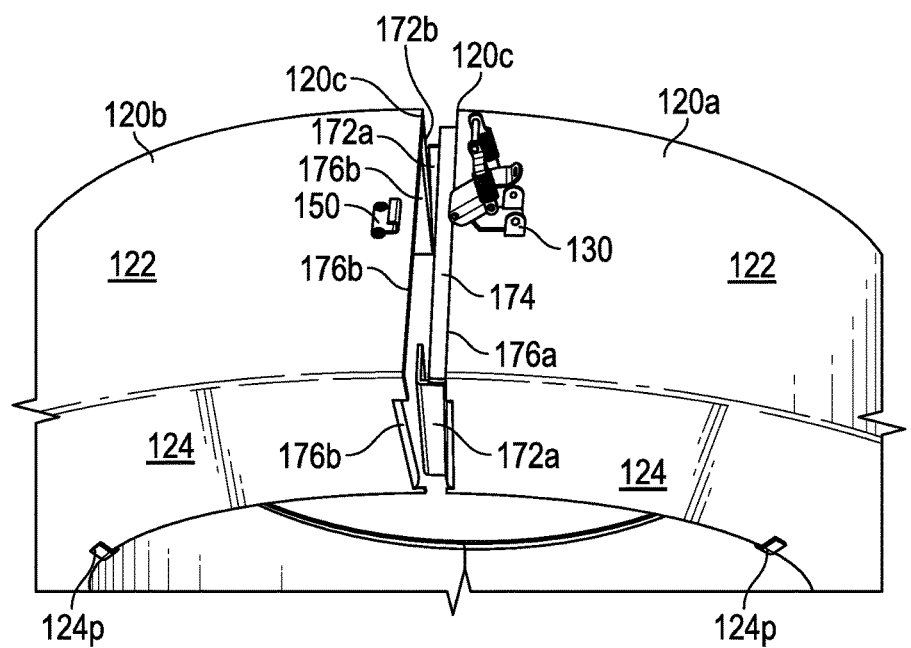
FIG. 12A is an enlarged, front perspective view of the upper ends of the partial shroud members of FIGS. 9 and 10 before they are coupled together.
Figure 12B:
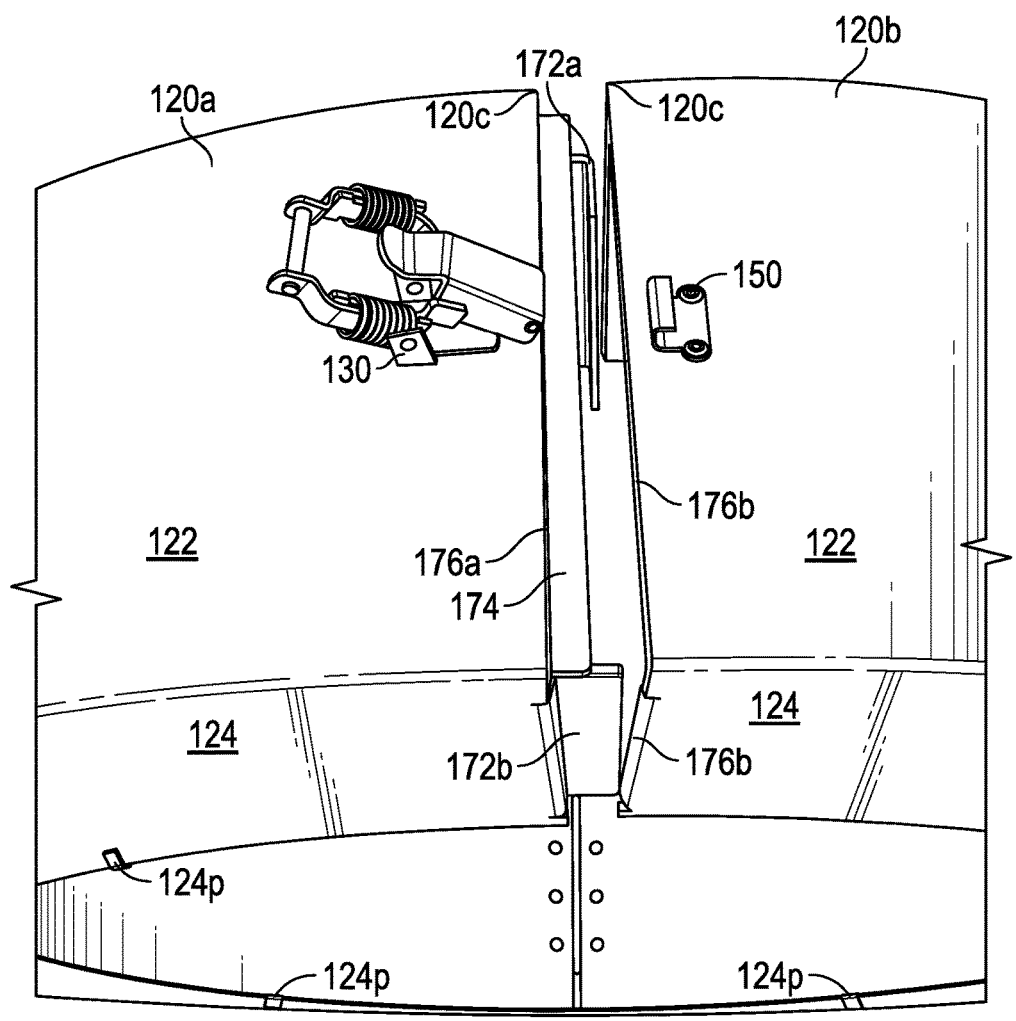
FIG. 12B is an enlarged, rear perspective view of the upper ends of the partial shroud members of FIGS. 9 and 10 before they are coupled together.

Upper ends 120c of each partial shroud member 120a, 120b are configured to interlock with one another. This is best understood with reference to FIGS. 12A and 12B where the upper end 120c of each partial shroud member 120a, 120b is shown in a position prior to installation on meter body 10. As shown, one side member 124 of partial shroud member 120a terminates in a first elongate lip 172a, while the opposing side member 124 of shroud member 120a terminates in a second elongate lip 172b. Each side member 124 of partial shroud member 120b terminates in a mating surface 176b. Mating surfaces 176b of shroud portion 120b are configured to mate with and engage the opposing and corresponding lips 172a and 172b of shroud portion 120a when shroud 120 is installed on meter body 10. The upper end 120c of the outer strip 122 of partial shroud member 120a further includes a facing surface 176a and elongate lip 174 that extends beyond facing surface 176a toward partial shroud member 120b. The upper end 120c of the outer strip 122 of partial shroud member 120b includes a facing surface 176b. When partial shroud members 120a, 120b are coupled together, facing surfaces 176a, 176b are brought into abutting engagement with one another, and elongate lip 174 fits inside of and engages the innermost end of facing surface 176b.

Figure 13:
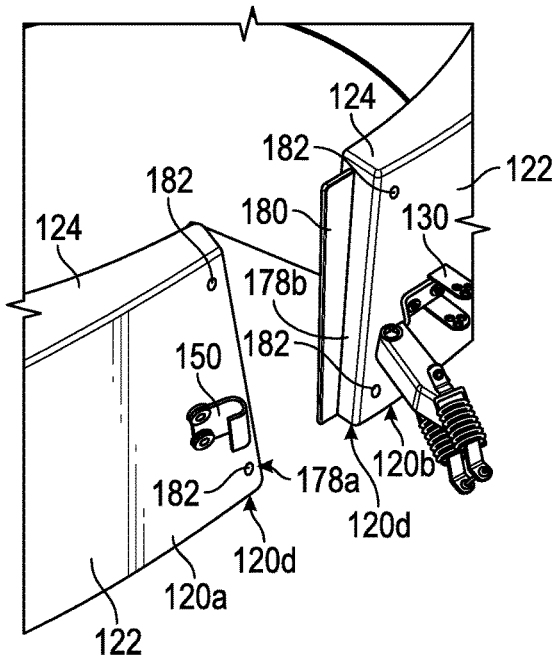
FIG. 13 is an enlarged, perspective view of the lower ends of the partial shroud members of FIGS. 9 and 10 before they are coupled together.

In a similar manner, lower ends 120d of each partial shroud member 120a, 120b are configured to interlock with one another. As best shown in FIG. 13, the lower end 120d of each partial shroud member 120a, 120b is shown in a position prior to installation on meter body 10. Lower end 120d of partial shroud member 120b includes facing surface 178b and an elongate lip 180 that extends beyond facing surface 178a toward partial shroud member 120a. Lower end 120d of partial shroud member 120a includes facing surface 178a. When partial shroud members 120a, 120b are coupled together, facing surfaces 178a, 178b are brought into abutting engagement with one another, and elongate lip 180 engages and fits inside of the innermost end of facing surface 178a. Collectively, the interlocking engagement of upper ends 120c and of lower ends 120d, particularly in conjunction with the engaging elongate lips and surfaces 172a, 172b, 174, 176a, 176b, 178a, and 180, form a means to prevent entry of insects into the wireway formed by annular chamber 125 that might otherwise occur if the ends of the partial shroud members 120a, 120b lacked such features. Each shroud portion 120a and 120b include a pair of drain holes 182 disposed proximal lower end 120d to allow for the drainage of water collected in shroud 120.

Referring to FIGS. 1-8, shrouds 120 are configured to be secured about the outer surface 14 of tubular section 12 of the meter body 10. Specifically, the inner radial edge 124i of each side member 124 is received within a circumferential groove 14c of outer surface 14. The engagement between circumferential grooves 14c and the side members 124 helps secure each partial shroud member 120a, 120b in its axial position (relative to central axis 15) and ensure that outer axial section 14a of outer surface 14 remains covered. In this manner, each transducer cable 25 may extend from a transducer 26 to the longitudinal channel 17 of central tubular section 12 via the chamber 125 and thereby remain protected from outside influences.

To secure shroud 120 about meter body 10, each partial shroud member 120a, 120b includes a hasp or latch connector 130 disposed at one end (120c or 120d) and a hook connector 150 disposed at the opposite end. Specifically, and referring to FIG. 11, partial shroud member 120a includes a hasp connector 130 at upper end 120c and a hook connector 150 at lower end 120d, while partial shroud member 120b includes a hook connector 150 at upper end 120c and a hasp connector 130 at lower end 120*d*. When engaged, hook connector 150 and hasp connector 130 form a buckle fastener.

Figure 11:
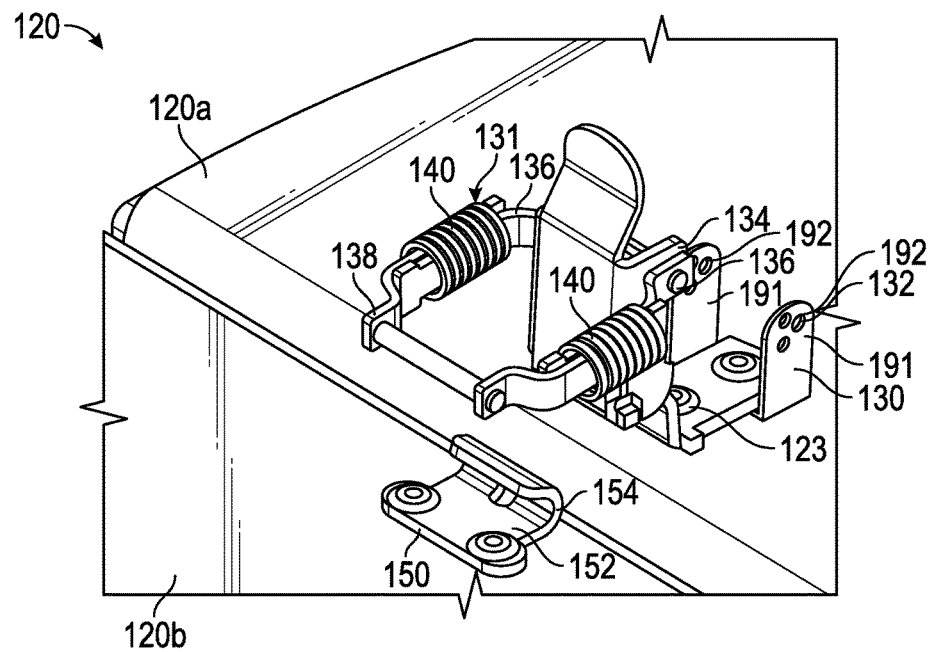
FIG. 11 is an enlarged, perspective view of a latching mechanism for coupling the two partial shroud members shown in FIGS. 9 and 10 to form the protective shroud in accordance with principles disclosed herein.

Referring to FIG. 11, hasp connector 130 generally includes a mounting bracket 132 coupled to outer strip 122 via a pair of fasteners 123, a fastener 134 pivotally coupled to the bracket 132, a pair of arms 136 pivotally coupled to the fastener 134, and a U-shaped clasp 138 coupled to the pair of arms 136 via a pair of biasing members such as springs 140. Due to the pivotal coupling between bracket 132 and fastener 134, fastener 134 may rotate with respect to bracket 132 between a first or open position (shown in FIG. 11) and a second or closed position (shown in FIGS. 2, 4) where fastener 134 is rotated clockwise with respect to the position of fastener 134 shown in FIG. 11. Also, the pivotal connection between arms 136 and fastener 134 allows arms 136 to rotate relative to fastener 134. Clasp 138 is coupled to arms 136 via biasing members 140, and thus, clasp 138 may be extended or displaced away from fastener 134 by compressing biasing members 140, such as by providing a tension force on clasp 138 in a direction away from fastener 134. Hook connector 150 generally includes a mounting bracket 152 coupled to outer strip 122 and having a hook or receptacle 154 configured to releasably couple with clasp 138 of hasp connector 130.

Hasp connector 130 may be coupled with hook connector 150 by rotating clasp 138 until it is received in receptacle 154, and then rotating fastener 134 away from hook connector 150. Once fastener 134 is rotated into a closed position, the spring force provided by biasing members 140 locks fastener 134 into the closed position, thereby fixably coupling partial shroud members 120*a* and 120*b* together about meter body 10. In this manner, the hasp connector 130 at upper end 120*c* of member 120*a* may be coupled to the hook connector 150 at upper end 120*c* of member 120*b*, and the hasp connector 130 at the lower end 120*d* of member 120*b* may be coupled with hook connector 150 at the lower end 120*d* of member 120*b*, thereby forming an assembled shroud 120. In this manner, the spring force provided by biasing members 140 causes the interconnection of hook connector 150 and hasp connector 130 to draw together partial shroud members 120*a*, 120*b* to help secure shrouds 120 in position on the meter body 10 with side member edges 124*i* retained in grooves 14*c*.

Referring again to FIG. 11, mounting bracket 132 of hasp connector 130 further includes a pair of upstanding side portions 191 and at least one aperture 192 formed in each side portion 191. With fastener 134 rotated into the closed position (FIGS. 2, 4), an indicator, such as a wire, strip of plastic, lead seal or other material may be disposed through an aperture 192 in each side portion 191 and suitably secured in place such that the indicator must be broken or removed in order for fastener 134 to be rotated to an open position (shown in FIG. 11.) That is, to release the partial shroud members 120*a*, 120*b* and remove shroud 120 to access the transducers 26, the indicator must be broken or removed to allow the fastener 134 to rotate through the space between the upstanding side portions 191. With this arrangement, clear visual evidence is provided to service personnel indicating whether the shroud portions 120*a*, 120*b* have been removed after installation.

Although the embodiment shown in FIG. 11 includes hasp connector 130 and corresponding hook connector 150 for coupling members 120*a* and 120*b*, in other embodiments other releasable connectors or latching mechanisms known in the art may be used to couple partial shroud members 120*a* and 120*b* to form an assembled shroud 120.

Referring to FIGS. 5 and 14-20, each transducer cable 25 passes from longitudinal channel 17 into lower electronics housing 80 via mount bracket 40, which is coupled to the outer surface 14 of central tubular section 12 of meter body 10. Mount bracket 40 is generally configured to protect each transducer cable 25 as it passes from longitudinal channel 17 to lower electronics housing 80, and to support lower and upper electronics housings 80 and 100. Mount bracket 40, which may also be described herein as a mounting member, has a central or longitudinal axis 45 that is normal to central axis 15 of flow meter 8 and generally includes a rectangular base or lower bracket 42, a pair of supporting flanges 44, a tubular member 46 disposed coaxially with central axis 45, and a rectangular upper bracket 48. Lower bracket 42 is configured to couple mount bracket 40 to the central tubular section 12 and includes a plurality of apertures 42*a* extending therethrough, with each aperture 42*a* configured to receive a threaded fastener 30 (FIG. 5). Also, each aperture 42*a* may be aligned with a corresponding aperture 14*e* (FIG. 7) extending into outer surface 14 of central tubular member 12. In this manner, a threaded fastener 30 may be extended through each aperture 42*a* of lower bracket 42 and into each aperture 14*e*, as shown in FIG. 5, thereby securing bracket member 40 to meter body 10. Further, a gasket may be disposed between the lower surface of base 42 and the outer surface 14 of tubular section 12 to provide a seal therebetween. While in the embodiment described herein, the mount bracket 40 is coupled to meter body 10 via fasteners 30, in other embodiments, mount bracket 40 may be coupled to meter body 10 using other fastening mechanisms known in the art.

Figure 15:
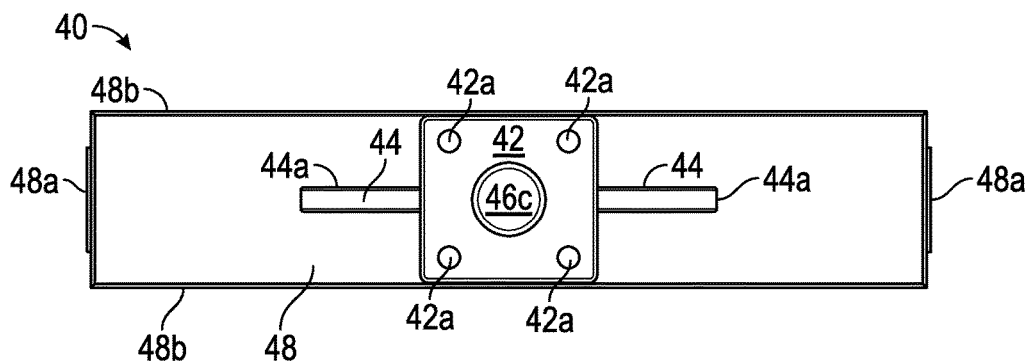
FIG. 15 is a bottom view of the electronic mount bracket assembly of FIG. 14 without the removable covers.
Figure 16:
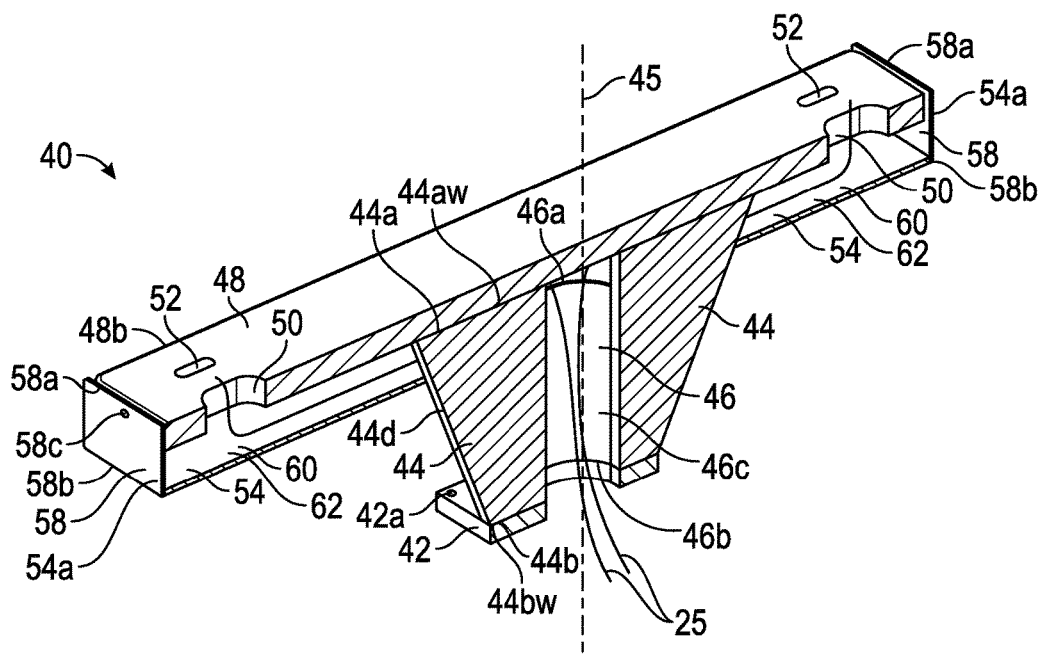
FIG. 16 is a perspective, cross-sectional view of the electronic mount bracket assembly along line 16-16 in FIG. 14.

As best shown in FIGS. 15 and 16, axially extending flanges 44 extend between lower bracket 42 and upper bracket 48. Each flange 44 includes a first or upper end 44*a* coupled to upper bracket 48 and a second or lower end 44*b* coupled to lower bracket 42. Each flange 44 also includes a radially inner end 44*c* that extends parallel, but radially offset from central axis 45, and a radially outer end 44*d* that extends at an angle with respect to central axis 45. Due to the angular offset between radially outer end 44*d* from central axis 45, the width 44*a$_w$* of upper end 44*a* is greater than the width 44*b$_w$* of lower end 44*b*. In this manner, the greater width 44*a$_w$* of upper end 44*a* provides greater lateral support along the length of upper bracket member 48.

Tubular member 46, generally configured to serve as a conduit or wireway for the transducer cables 25, extends upward from lower bracket 42 and includes a first or upper end 46*a* displaced from bracket 42 and a second or lower end 46*b* coupled to lower bracket 42. Tubular member 46 also includes a generally cylindrical passage 46*c* in which transducer cables 25 may pass through, and a general cylindrical outer surface 46*d* that couples to the radially inner end 44*c* of each axially extending flange 44.

Figure 17:
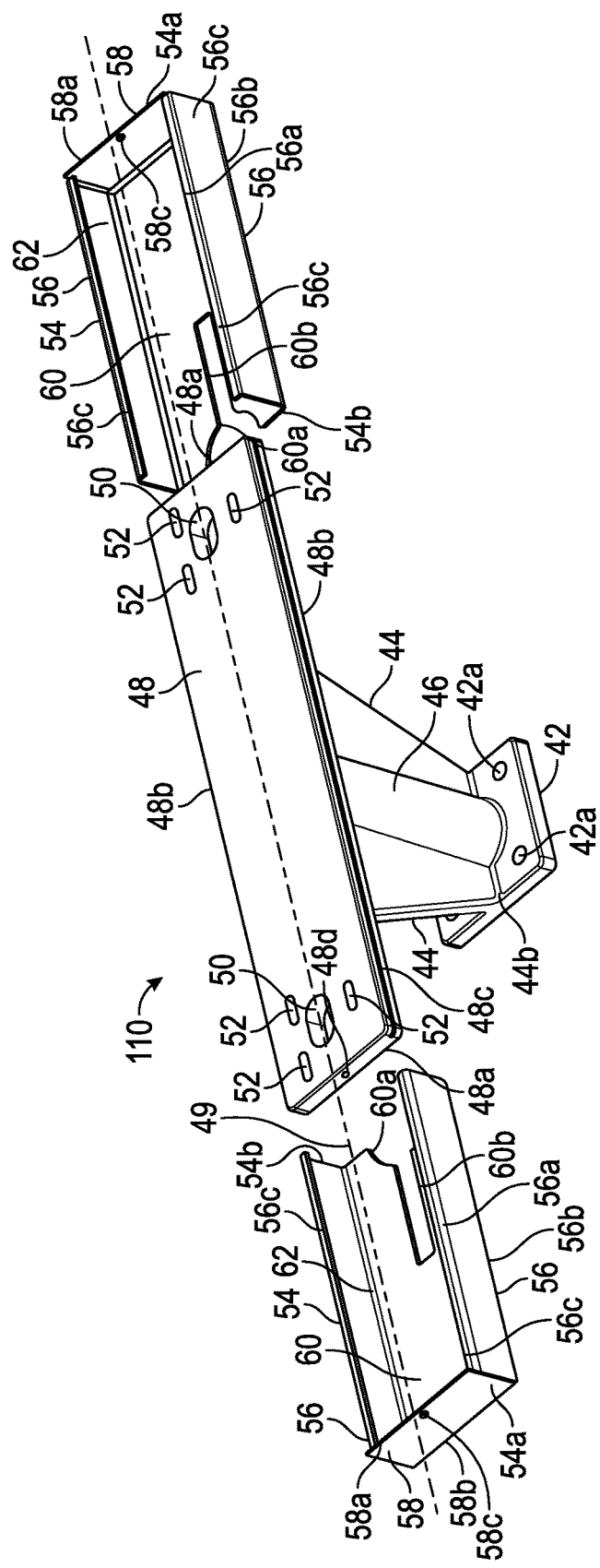
FIG. 17 is an exploded perspective view of the electronic mount bracket assembly of FIG. 14.
Figure 20:
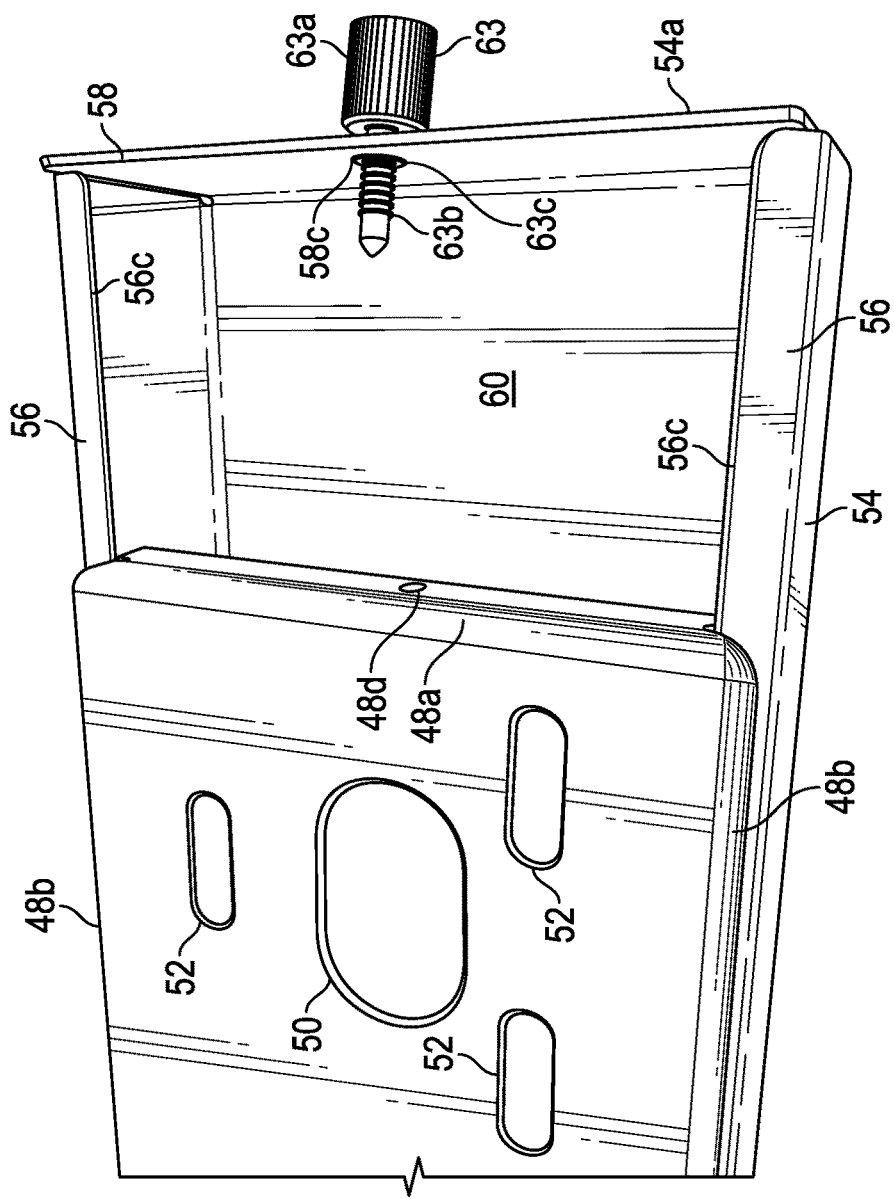
FIG. 20 is an enlarged, exploded top view of an embodiment of a captive screw of the electronic mount bracket assembly of FIG. 14.

As best shown in FIG. 17, upper bracket 48 includes a longitudinal axis 49 that intersects and extends normal to central axis 45, a pair of axial ends 48*a*, and a pair of lateral ends 48*b*. A groove 48*c* extends axially between axial ends 48*a* and radially into each lateral end 48*b*. Also, an aperture 48*d* extends into each axial end 48*a* of upper bracket member 48 from a location disposed generally equidistant between each lateral end 48*b*. An axially aligned elongate aperture 50 extending through upper bracket 48 is disposed proximal to each axial end 48*a* and is coaxially aligned with longitudinal axis 49. Each aperture 50 is configured to allow the passage of transducer cables 25 into a corresponding lower electronic housing 80. A plurality of elongate, slotted apertures 52 are disposed about each aperture 50, with two axially aligned elongate apertures 52 radially offset from aperture 50 towards a first lateral end 48a, and a single elongate aperture 52 axially aligned with aperture 50 and radially offset from channel 50 towards a second lateral end 48a of upper bracket 48. Elongate apertures 52 are generally configured to allow for the coupling of each lower electronic housing 80 with upper bracket 48 and electronic mount bracket 40. In an embodiment, upper electronics housings 100 may be rigidly connected using an explosion proof conduit, thereby allowing the direct passage of electrical data and power signals between each upper housing 100. In this embodiment, the elongate apertures 52 may aid in the alignment of each pair of electronics housings 80 and 100 with respect to electronic mount bracket 40. While the embodiment shown in the Figures discussed herein includes elongate apertures 52, in other embodiments other fastening mechanisms known in the art may be used to allow for the coupling of lower electronic housings 80 to electronic mount bracket 40.

Electronic mount bracket 40 further includes a pair of removeable cable cover members 54 that are releasably and slidably coupled to upper bracket 48. Each removeable cover 54 has a longitudinal axis that is coaxially aligned with central axis 49 of upper bracket 48 when in an assembled position (i.e., coupled to upper bracket 48). Each removeable cover 54 includes a first axial end 54a, a second axial end 54b, a pair of lateral side members 56 extending between first and second axial ends 54a and 54b, an axial end member 58 disposed at axial end 54a and extending between the lateral sides 56, and a bottom member 60 extending between axial ends 54a and 54b and coupled to each lateral side 56. Each lateral member 56 includes a first or upper end 56a and a second or lower end 56b, where lower end 56b of each member 56 is coupled to bottom member 60. Also, axial end member 58 includes a first or upper end 58a and a second or lower end 58b coupled to bottom member 60. The above-described configuration of lateral members 56, axial end member 58, and bottom member 60 forms a chamber 62 disposed therein.

Each lateral end 56 includes a rail 56c at upper end 56a that extends laterally inwards towards the opposing lateral end 56. Axial end member 58 includes a circular aperture 58c proximal upper end 58a and disposed generally equidistantly between lateral ends 56. Bottom member 60 includes a semicircular aperture 60a extending therethrough and disposed at second end 54b, and a longitudinal, rectangular aperture 60b extending axially from semicircular aperture 60a towards first end 54a. The combination of semicircular aperture 60a and longitudinal aperture 60b forms a keyhole shaped slot or aperture extending from second end 54b.

As best shown in the exploded view of FIG. 17, each removeable cover 54 may be coupled to upper bracket 48 by displacing the cover 54 axially (with respect to longitudinal axis 49 of upper bracket 48) towards central axis 45 of mount bracket 40, and inserting the rail 56c of each lateral member 56 into one of the corresponding grooves 48c that extend into lateral ends 48b of upper bracket 48. This arrangement forms an interlocking relationship between lateral sides 56 of removeable cover 54 and lateral ends 48b of upper bracket 48. Each cover 54 may be further displaced axially towards central axis 45 until an inner surface of axial end member 58 engages of an axial end 48a of upper bracket 48, thereby fully inserting rails 56c into corresponding grooves 48c.

Figure 14:
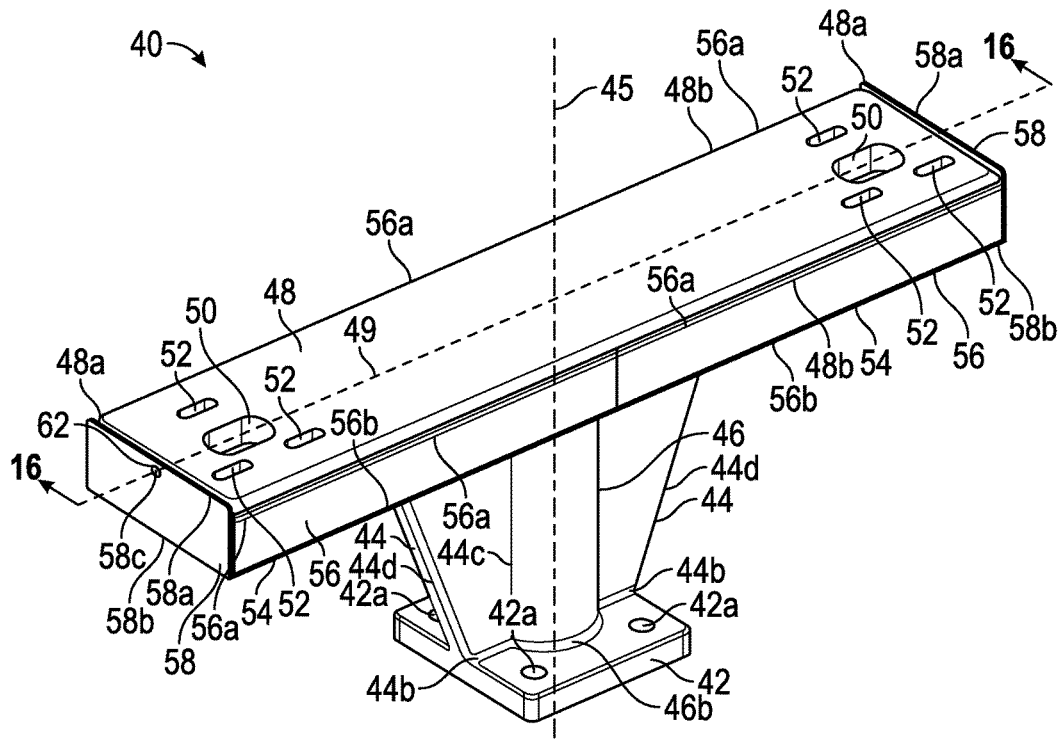
FIG. 14 is a perspective view an electronic mount bracket assembly, including removeable covers, of the ultrasonic flow meter of FIG. 1 in accordance with principles disclosed herein.

In this position, a threaded fastener 63 (FIGS. 14 and 20) may be extended through aperture 58c in axial end member 58 of each removeable cover 54 and into the corresponding aperture 48d that extends into each axial end 48c of upper bracket 48, thereby coupling each removeable cover 54 to upper bracket 48, as shown in FIG. 14. In this embodiment, fastener 63 comprises a captive screw having a handle 63a coupled to a threaded shaft 63b that extends through aperture 58c. Captive screw 63 also includes a flange 63c disposed about threaded shaft 63b disposed on the opposing side of axial end member 58 from handle 63a. Given that both handle 63a and flange 63c are larger in diameter than aperture 58c, and each are coupled to threaded shaft 63b on opposing sides of axial end member 58, captive screw 63 is thereby retained to axial end member 58. In this manner, captive screws 63 may form an integral component of removeable covers 54.

In this assembled configuration, tubular member 46 extends into and is disposed within the semicircular aperture 60a of the bottom member 60 of each removeable cover 54, and each flange 44 extends through a corresponding rectangular aperture 60b of the bottom member 60 of each removeable cover 54. Therefore, each transducer cable 25 may extend through cylindrical passage 46c of tubular member 46, into and through a chamber 62 of one of the removeable covers 54, and then through an aperture 50 of upper bracket 48, as shown in FIG. 16. In this manner, each transducer cable 25 is protected and isolated from the surrounding environment as it extends from longitudinal channel 17 of meter body 10 into the lower electronics housing 80.

Figure 21:
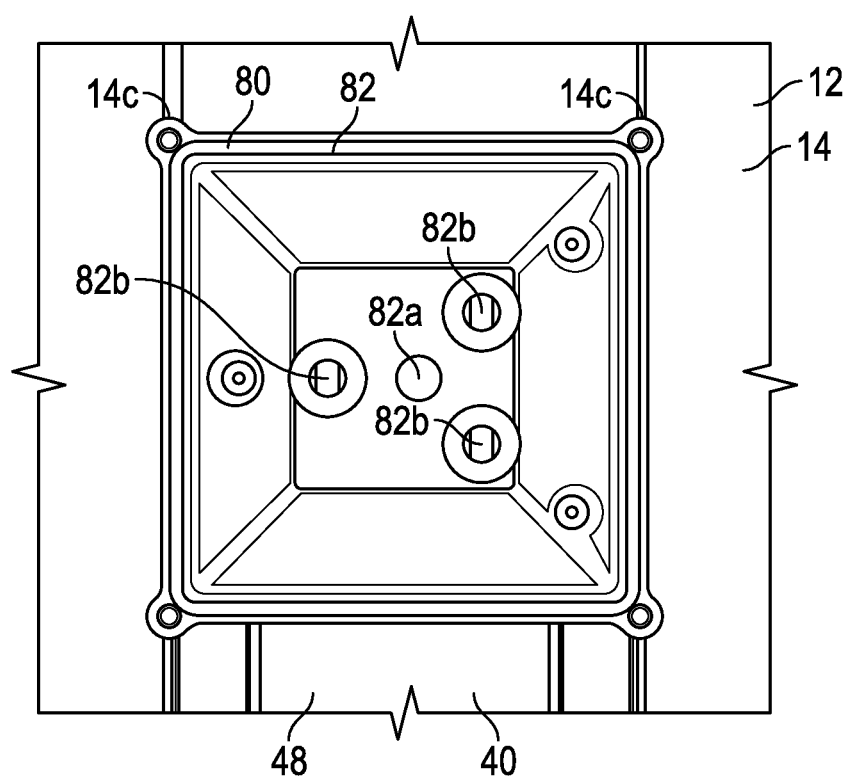
FIG. 21 is a plan view showing the bottom of lower electronics housing.

Referring to FIGS. 1-6 and 21, electronic mount bracket 40 is configured to couple with and support two lower electronic housings 80, each of which couple with and support an upper electronics housing 100 in this embodiment. Further, electronic mount bracket 40 distances lower and upper electronics housings 80 and 100 from the meter body 10, thereby protecting the electronics housed within electronics housings 80 and 100 from high temperature fluids that may be flowing through flow passage 13. Specifically, lower electronics housing 80 is disposed at a distance D (FIG. 5) from the outer surface 14 of the central tubular section 12 of meter body 10. Lower electronics housing 80 generally includes a bottom 82, sides 84, and a top 86. Retained within lower electronics housing 80 are one or more terminal strips and circuit boards, to which transducer cables 25 couple. As shown in FIG. 21, the bottom 82 of lower electronics housing 80 includes a first or central aperture 82a disposed centrally in bottom 82, and a plurality of second or surrounding apertures 82b disposed about central aperture 82a. Central aperture 82a may be aligned with elongate aperture 50 of upper bracket 48 to allow for the passage of transducer cables 25 into lower electronic housing 80. Surrounding apertures 82a may be aligned with apertures 52 of upper bracket member 48 to allow for the passage of a threaded fastener therethrough to releasably couple each lower electronic housing 80 to the upper bracket member 48 of electronic mount bracket 40. Upper electronics housing 100 may be similarly coupled to the top 86 of lower electronics housing 80.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. Accordingly, the scope of protection is not limited to the embodiments described herein, but is only limited by the claims that follow, the scope of which shall include all equivalents of the subject matter of the claims.

What is claimed is:

1. A flow meter comprising:
a meter body having a longitudinal axis and comprising a fluid passageway therethrough and an outer surface; and
a plurality of electronics housings supported on the meter body by a mounting member, wherein the mounting member comprises:
a base supported by the outer surface of the meter body;
a tubular member extending from the base, the tubular member having a passage extending therethrough for the passing of a transducer cable; and
a bracket member coupled to the tubular member distal the base, the bracket member having a pair of elongate slots, each configured to allow for the passage of a transducer cable to one of the electronics housings.

2. The flow meter of claim 1, wherein the mounting member further comprises a first removeable cover forming a first chamber between the first removeable cover and the bracket member, the first removeable cover comprising a bottom, and a pair of sides coupled to said bottom, the sides comprising a pair of rails slidingly received within a pair of grooves of the bracket member.

3. The flow meter of claim 2, further comprising:
a transducer assembly coupled to said meter body; and
a transducer cable having a first end coupled to the transducer assembly, the transducer cable extending through the passage in the tubular member and through the first chamber.

4. The flow meter of claim 2, wherein the first removeable cover comprises a keyhole shaped slot extending from an end of the first removeable cover member.

5. The flow meter of claim 2, wherein the mounting member further comprises a second removeable cover axially aligned with the first removeable cover, forming a second chamber between the second removeable cover and the bracket member, the second removeable cover comprising a bottom, and a pair of sides coupled to said bottom, the sides comprising a pair of rails slidingly received within a pair of grooves of the bracket member.

6. The flow meter of claim 2, wherein the first removeable cover comprises a fastener for coupling the first removeable cover to an axial end of the bracket member.

7. The flow meter of claim 6, wherein the fastener comprises a captive screw retained to the first removeable cover.

8. The flow meter of claim 1, wherein the tubular member comprises a flange having a first end coupled to the bracket member and a second end coupled to the base, wherein the first end has a width greater than the second end.

9. The flow meter of claim 1, further comprising a groove extending longitudinally along the outer surface of the meter body, the groove extending underneath the base of the mounting member.

10. The flow meter of claim 9 further comprising a shroud covering the transducer cable between the transducer assembly and the longitudinal groove.

11. A flow meter comprising:
a meter body having a longitudinal axis, and comprising a fluid passageway therethrough and an outer surface; and
an electronics housing supported on the meter body by a mounting member, wherein the mounting member comprises:
a base supported by the outer surface of the meter body;
a tubular member extending from the base, the tubular member having a passage extending therethrough for the passing of a transducer cable;
a bracket member coupled to the tubular member distal the base, the bracket member having an elongate slot configured to allow for the passage of a transducer cable to the electronics housing; and
a first removeable cover supported on the bracket member and configured to slide relative to the bracket member.

12. The flow meter of claim 11, wherein the mounting member further comprises a first removeable cover forming a first chamber between the first removeable cover and the bracket member, the first removeable cover comprising a bottom, and a pair of sides coupled to said bottom, the sides comprising a pair of rails slidingly received within a pair of grooves of the bracket member.

13. The flow meter of claim 12, further comprising:
a transducer assembly coupled to said meter body; and
a transducer cable having a first end coupled to the transducer assembly, the transducer cable extending through the passage in the tubular member and through the first chamber.

14. The flow meter of claim 12, wherein the first removeable cover comprises a keyhole shaped slot extending from an end of the first removeable cover.

15. The flow meter of claim 12, wherein the flow meter further comprises a second removeable cover axially aligned with the first removeable cover, forming a second chamber between the second removeable cover and the bracket member, the second removeable cover comprising a bottom, and a pair of sides coupled to said bottom, the sides comprising a pair of rails slidingly received within a pair of grooves of the bracket member.

16. The flow meter of claim 12, wherein the first removeable cover comprises a fastener for coupling the removeable cover to an axial end of the bracket member.

17. The flow meter of claim 16, wherein the fastener comprises a captive screw retained to the removeable cover.

18. The flow meter of claim 11, wherein the bracket member comprises a flange having a first end coupled to the bracket and a second end coupled to the base, wherein the first end has a width greater than the second end.

19. The flow meter of claim 11, wherein the bracket member of the mounting member comprises a pair of elongate slots, each configured to allow for the passage of a transducer cable to the electronics housing.

20. The flow meter of claim 11, further comprising a groove extending longitudinally along the outer surface of the meter body, the groove extending underneath the base of the mounting member, and a shroud covering the transducer cable between the transducer assembly and the longitudinal groove.

* * * * *